UNITED STATES PATENT OFFICE.

JOHN L. THOMPSON AND GEORGE CUNNINGHAM, OF NEW CASTLE, MAINE.

ARTIFICIAL MARBLE OR STONE.

SPECIFICATION forming part of Letters Patent No. 242,075, dated May 24, 1881.

Application filed April 21, 1881. (No specimens.)

*To all whom it may concern:*

Be it known that we, JOHN L. THOMPSON and GEORGE CUNNINGHAM, both of New Castle, in the county of Lincoln and State of Maine, have invented new and useful Improvements in Producing Artificial Marble and Stone, of which the following is a specification.

This invention consists in the below-described process for producing imitation or artificial marble or stone, to be used for panels in various places, such as the interior of cars, &c., for furniture-tops, as in tables, bureaus, and the like, and in other places where light slabs would be of service or ornamental.

The process is as follows: A piece or plate of transparent glass has copal varnish or other transparent adhesive substance applied to its rear side, and then a mixture of granulated sea-shells and small pebbles is spread upon it until the rear side of the glass is entirely covered, the mixture adhering thereto by means of the adhesive substance above mentioned. It is then allowed to "set" and dry for a few hours, when a backing of Portland cement or similar substance is applied to the granulated material, thus making it firm and solid. It can then be mounted or framed, or not, as desired. The result is a smooth and durable slab resembling marble or stone, which, as the surface is glass, cannot be stained or spotted, and is not easily defaced in any manner. Different degrees of granulation give variety to the article.

In order to imitate marble and stone of different shades and colors coloring-matter is applied in either of two ways, one of which is to sprinkle pulverized paint in with the granulated substance before it is applied to the back of the glass; and the other, and perhaps the preferable way, is, after the granulated substance has been sprinkled upon the glass, to throw more or less pulverized coloring material over it, and then to brush it in, as desired, with a moist brush. Bits of gold or silver leaf or bronze can be introduced, if desired. The effect produced is very beautiful, and capable of almost infinite variation, and the article is exceedingly durable and inexpensive.

Having thus fully described our invention, what we claim, and desire to secure by Letters Patent, is—

The hereinbefore-described process of producing imitation marble and stone, consisting of spreading copal varnish or other similar adhesive substance upon the rear side of a plate of transparent glass, applying a mixture of granulated sea-shells and pebbles to the adhesive side of said glass, said mixture being provided with coloring material, if desired, and then backing the mixture with Portland cement or similar substance, all substantially as set forth.

JOHN L. THOMPSON.
GEORGE CUNNINGHAM.

Witnesses:
JOHN B. RAFTER,
STEPHEN CHAPMAN.